(12) United States Patent
De Ayguavives et al.

(10) Patent No.: US 9,389,435 B2
(45) Date of Patent: Jul. 12, 2016

(54) OPHTHALMIC LENS

(71) Applicants: Francisco De Ayguavives, Charenton le Pont (FR); Helene Maury, Charenton le Pont (FR)

(72) Inventors: Francisco De Ayguavives, Charenton le Pont (FR); Helene Maury, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 0 days.

(21) Appl. No.: 14/401,630

(22) PCT Filed: May 16, 2013

(86) PCT No.: PCT/FR2013/051073
§ 371 (c)(1),
(2) Date: Nov. 17, 2014

(87) PCT Pub. No.: WO2013/171434
PCT Pub. Date: Nov. 21, 2013

(65) Prior Publication Data
US 2015/0103310 A1    Apr. 16, 2015

(30) Foreign Application Priority Data

May 16, 2012  (FR) ...................................... 12 54529
Oct. 11, 2012  (FR) ...................................... 12 59713

(51) Int. Cl.
*G02C 7/10*        (2006.01)
*G02B 1/11*        (2015.01)
(Continued)

(52) U.S. Cl.
CPC  *G02C 7/107* (2013.01); *G02B 1/11* (2013.01); *G02B 5/26* (2013.01); *G02B 5/283* (2013.01); *G02C 7/02* (2013.01); *G02C 7/102* (2013.01); *G02C 7/104* (2013.01)

(58) Field of Classification Search
CPC .............. G02C 7/02; G02C 7/04; G02C 7/10; G02C 7/102; G02C 7/107

USPC ................ 351/159.02, 159.49, 159.6–159.65
See application file for complete search history.

(56) References Cited

U.S. PATENT DOCUMENTS 4,793,669 A   12/1988  Perilloux
5,741,831 A    4/1998  Keita et al.
(Continued)

FOREIGN PATENT DOCUMENTS

EP    0 614 957 A1    9/1994
FR    2 734 827 A1   12/1996
(Continued)

OTHER PUBLICATIONS

Elaine Kitchel, "The Effects of Blue Light on Ocular Health", American Printing House for the Blind, This research synthesis has been published in the Journal of Visual Impairment and Blindness, Jun. 2000. NY: AFB Press, pp. 1-12.

(Continued)

*Primary Examiner* — Darryl J Collins
(74) *Attorney, Agent, or Firm* — Young & Thompson (57) ABSTRACT

An ophthalmic lens having a front and back face, at least one including a filter, which provides the main face/filter with the following properties:
- an average blue reflectance factor within a wavelength ranging from 420-450 nm, which ≥5%, for an angle of incidence θ ranging from 0°-15°,
- a spectral reflectivity curve for θ, having:
  - a maximum reflectivity at a wavelength <435 nm, and
  - a full width at half maximum ≥80 nm, and
- for θ ranging from 0°-15° and for θ' ranging from 30°-45°, a parameter $\Delta(\theta,\theta')=1-[R_{\theta'}(435\text{ nm})/R_\theta(435\text{ nm})]$, such that $\Delta(\theta,\theta')\geq 0.6$, where
  $R_\theta(435\text{ nm})$ represents the reflectivity value of the main face/filter at a wavelength of 435 nm for θ, and
  $R_{\theta'}(435\text{ nm})$ represents the reflectivity value of the main face/filter at a wavelength of 435 nm for θ'.

21 Claims, 3 Drawing Sheets

(51) Int. Cl.
  *G02C 7/02* (2006.01)
  *G02B 5/28* (2006.01)
  *G02B 5/26* (2006.01)

(56) References Cited

U.S. PATENT DOCUMENTS

| | | |
|---|---|---|
| 7,678,464 B2 | 3/2010 | Dang et al. |
| 2003/0165698 A1 | 9/2003 | Vaneeckhoutte et al. |
| 2004/0233524 A1 | 11/2004 | Lippey et al. |
| 2007/0026237 A1 | 2/2007 | Dang et al. |
| 2008/0206470 A1 | 8/2008 | Thomas et al. |
| 2010/0149483 A1 | 6/2010 | Chiavetta, III |

FOREIGN PATENT DOCUMENTS

| | | |
|---|---|---|
| WO | 2008/024414 A2 | 2/2008 |
| WO | 2008107325 A1 | 9/2008 |
| WO | 2012/076714 A1 | 6/2012 |

OTHER PUBLICATIONS

Ophthalmic optics—Uncut finished spectacle lenses—Transmittance specifications and test methods, International Standard, ISO 8980-3, Second edition Oct. 1, 2003.

Ophthalmic optics—Spectacle lenses—Vocabulary—International Standard, ISO 13666, First edition Aug. 1, 1998.

Algvere et al., "Age-related maculopathy and the impact of blue light hazard", Acta Ophthalmologica Scandinavica, 2006, vol. 84, pp. 4-15.

Glazer-Hockstein et al., "Could Blue Light-Blocking Lenses Decrease the Risk of Age-Related Macular Degeneration?", Retina, 2006, vol. 26, pp. 1-4.

Tomany et al., "Sunlight and the 10-Year Incidence of Age-Related Maculopathy", Arch Ophthalmol., 2004, vol. 122, pp. 750-757.

International Search Report, dated Dec. 17, 2013, from corresponding PCT application.

ISO 8980-4, Norme Internationale, "Ophthalmic optics—Uncut finished spectacle lenses—Part 4: Specifications and test methods for anti-reflective coatings," Jun. 1, 2000.

OPHTHALMIC LENS

BACKGROUND OF THE INVENTION

The present invention relates to the ophthalmic optics field.

It relates more particularly to an ophthalmic lens, one of both main faces of which comprises an optical filter intended to reduce the blue light-induced phototoxic effects on the retina of a spectacle wearer.

Throughout the present patent application, it will be referred as a principle to value ranges, in particular to ranges of wavelengths and angles of incidence. As used herein, "ranging from x to y" means "within the range from x to y", both limits x and y being included within this range.

Visible light to humans extends over a light spectrum ranging from a 380 nanometers (nm) wavelength to a 780 nm wavelength approximately. The part of this spectrum, ranging from around 380 nm to around 500 nm, does correspond to a high-energy, essentially blue light.

DESCRIPTION OF THE RELATED ART

Many studies (see for example Kitchel E., *The effects of blue light on ocular health* », Journal of Visual Impairment and Blindness Vol. 94, No. 6, 2000 or Glazer-Hockstein and al., Retina, Vol. 26, No. 1. pp. 1-4, 2006) suggest that blue light has phototoxic effects on human eye health, and especially on the retina.

Indeed, ocular photobiology studies (Algvere P. V. and al., *Age-Related Maculopathy and the Impact of the Blue Light Hazard* », Acta Ophthalmo. Scand., Vol. 84, pp. 4-15, 2006) and clinical trials (Tomany S. C. and al., *Sunlight and the 10-Year Incidence of Age-Related Maculopathy. The Beaver Dam Eye Study* », Arch Ophthalmol., Vol. 122. pp. 750-757, 2004) demonstrated that an excessively prolonged or intense exposure to blue light may induce severe ophthalmic diseases such as age-related macular degeneration (ARMD).

However, part of this blue light, with a wavelength ranging from 465 nm to 495 nm approximately, is good to health since it is implicated in mechanisms for regulating biorhythms, referred to as "circadian cycles".

Thus, it is recommended to limit the exposure to blue light potentially harmful, in particular as regards the wavelength band with an increased dangerousness (see especially Table B1, ISO 8980-3 standard:2003 (E) with reference to the B($\lambda$) blue light dangerousness function).

To that end, it may be advisable to wear before each of both eyes an ophthalmic lens which prevents or limits the phototoxic blue light transmission to the retina.

It has already been suggested, for example in the patent application WO 2008/024414, to cut at least partially, the troublesome part of the blue light spectrum from 400 nm to 460 nm, by means of lenses comprising a film partially inhibiting the light in the suitable wavelength range, through absorption or through reflection.

Moreover, the person skilled in the art is seeking for filters which would enable to minimize the amount of harmful blue light received by the retina, while preserving the ability to efficiently transmit the visible light by wavelengths higher than 465 nm so as to, to the one hand, maintain a good vision for the wearer and, to the other hand, not to alter the circadian cycles.

The difficulty lies in the fact that the wavelength ranges of from 420 nm to 450 nm to be filtered are very close to the wavelength ranges which should not be, or very little, filtered.

It is an object of the present invention to provide an ophthalmic lens comprising a reflection filter, which would take the whole light irradiation originating from the surrounding area into account and reduce the blue light amount received by the eye in the wavelength range of from 420 nm to 450 nm, while enabling an outstanding transmission within the wavelength range of from 465 nm to 495 nm.

It is another object of the present invention to provide an ophthalmic lens comprising such a reflection filter, which enables an outstanding transmission within the wavelength range of from 465 nm to 495 nm.

It is another object of the present invention to provide an ophthalmic lens comprising a reflection filter with the hereabove mentioned properties, which would be easy and economical to implement on the industrial level.

Generally speaking, filters may be designed, which are said to be "narrow", highly selective, having a limited bandpass and a peak in reflectivity centered on this bandpass. For limiting the phototoxic blue light transmission to the retina, a suitable narrow-band filter should thus have for example a full width at half maximum of 30 nm between 420 nm and 450 nm, and a maximum reflectivity for the wavelength around the center of 435 nm.

In practice, highly selective, narrow-band filters are typically composed of an overall thick stack, comprising a plurality of dielectric layers.

Such filters require a long and expensive industrial manufacturing process, especially when deposited under vacuum. Increasing the number of layers and the number of interfaces makes it also difficult to obtain good mechanical properties.

Taking the hereabove mentioned constraints into account leads to limit the number of layers, which as a result does limit the performances in terms of spectral selectivity (where the full width at half maximum of such a narrow-band filter may then reach up to 70 nm) and angular selectivity, the filter becoming angularly poorly selective. This means that if, for wavelengths ranging from 420 nm to 450 nm, the reflectivity of the main face of an ophthalmic lens provided with such a narrow-band filter is high for angles of incidence on this main face ranging from 0° to 15°, then the reflectivity for angles of incidence ranging from 30° to 45° on the same main face will also be relatively high.

The angle of incidence is classically defined as the angle between the perpendicular to the surface at the point of incidence and the direction of the light beam striking this surface.

This results in a number of consequences for a spectacle wearer provided with ophthalmic lenses, on the front main face of which an optical narrow-band filter such as previously described has been deposited. It should be understood in the present context that the front main face of the ophthalmic lens is that main face of the ophthalmic lens, which is the most distant from the spectacle wearer's eyes. By contrast, the main face of the ophthalmic lens, which is the nearest from the spectacle wearer's eyes is the back main face.

Thus positioned in relation to the spectacle wearer's eyes, the ophthalmic lenses receive, to the one hand, some "direct" incident light on the front main faces of the ophthalmic lenses, and, to the other hand, some "indirect" light originating from the wearer's background and reflected by the ophthalmic lenses.

The light coming from the wearer's background, reflected by the ophthalmic lens and directed to the wearer's eye is mainly the light incident on the back main face of the ophthalmic lens according to angles of incidence ranging from 30° to 45°.

This visible light originating from the wearer's background at an angle of incidence ranging from 30° to 45° goes through the back main face, onto which a first reflection occurs, then through the substrate, to reach thereafter the front main face comprising said filter.

Moreover, it is known that the optical properties of a filter deposited onto the front main face of an ophthalmic lens, for example reflectivity, are equivalent, whatever the light being incident on the side of the front main face or originating from the side of the back main face.

If the narrow-band filter does efficiently reflect the blue light with a wavelength ranging from 420 nm to 450 nm for an angle of incidence on the front main face ranging from 30° to 45°, then it does also efficiently reflect that blue light coming from the back, for an angle of incidence ranging from 30° to 45° on the back main face.

Thus, even if the direct light incident on the front main faces of the ophthalmic lenses is efficiently rejected through the reflection against the narrow-band filters deposited onto the front main faces, the indirect light originating from the wearer's background is reflected just as good to the spectacle wearer's eyes.

Ultimately, despite the use of a narrow-band filter, the amount of phototoxic blue light reaching the wearer's retina can be relatively great and be dangerous to the wearer.

Moreover, the filter, whatever the location thereof, on the front face or on the back face, does behave in the same way as regards the light within the wavelength range of from 420 nm to 450 nm, since the ophthalmic lens, in both cases, transmits the light within the wavelength range of from 420 nm to 450 nm. The same phototoxic blue light-induced harmful consequence thus occurs for the wearer if the filter, instead of being deposited onto the front main face of the ophthalmic lens, is applied on the back main face thereof.

Moreover, as already previously mentioned, narrow-band reflection filters comprising a limited number of layers and a thickness compatible with a large-scale industrial production suffer from a reduced spectral selectivity, and are likely to reflect a significant part of the light within the circadian cycle-governing range.

BRIEF SUMMARY OF THE INVENTION

To address the needs of the present invention and to remedy to the mentioned drawbacks of the prior art, the applicant provides an ophthalmic lens fitted with a reflection filter, which would enable to reduce the amount of phototoxic blue light striking the retina of a user wearing such ophthalmic lens, while preserving at best the circadian cycles.

To that end, the present invention relates to an ophthalmic lens having a front main face and a back main face, at least one of both main faces comprising a filter, which provides the main face comprising said filter with the following properties:
    an average blue reflectance factor ($R_{m,B}$) within a wavelength range of from 420 nanometers to 450 nanometers, which is higher than or equal to 5%, for an angle of incidence ranging from 0° to 15°,
    a spectral reflectivity curve for an angle of incidence ranging from 0° to 15°, such reflectivity curve having:
        a maximum reflectivity at a wavelength of less than 435 nanometers, and
        a full width at half maximum (FWHM) higher than 80 nanometers, and
    for an angle of incidence $\theta$ ranging from 0° to 15° and for an angle of incidence $\theta'$ ranging from 30° to 45°, a parameter $\Delta(\theta,\theta')$ defined by the relation $\Delta(\theta,\theta')=1-[R_{\theta'}(435\ nm)/R_{\theta}(435\ nm)]$, in such a way that this parameter $\Delta(\theta,\theta')$ is higher than or equal to 0.6, where
        $R_\theta(435\ nm)$ represents the reflectivity value of the main face comprising said filter, at a 435 nanometer-wavelength for the angle of incidence $\theta$, and
        $R_{\theta'}(435\ nm)$ represents the reflectivity value of the main face comprising said filter at a 435 nanometer-wavelength for the angle of incidence $\theta'$.

In another embodiment, the present invention relates to an ophthalmic lens having a front main face and a back main face, at least one of both main faces comprising a filter, which provides the main face comprising said filter with the following properties:
    an average blue reflectance factor ($R_{m,B}$) within a wavelength range of from 420 nanometers to 450 nanometers, which is higher than or equal to 5%, for an angle of incidence ranging from 0° to 15°,
    a spectral reflectivity curve for an angle of incidence ranging from 0° to 15°, this reflectivity curve having:
        a maximum reflectivity at a wavelength of less than 435 nanometers, and
        a full width at half maximum (FWHM) higher than or equal to 70 nanometers, preferably higher than or equal to 75 nm, and
    for an angle of incidence $\theta$ ranging from 0° to 15° and for an angle of incidence $\theta'$ ranging from 30° to 45°, a parameter $\Delta(\theta,\theta')$ defined by the relation $\Delta(\theta,\theta')=1-[R_{\theta'}(435\ nm)/R_{\theta}(435\ nm)]$, in such a way that this parameter $\Delta(\theta,\theta')$ is higher than or equal to 0.5, where
        $R_\theta(435\ nm)$ represents the reflectivity value of the main face comprising said filter at a 435 nanometer-wavelength for the angle of incidence $\theta$, and
        $R_{\theta'}(435\ nm)$ represents the reflectivity value of the main face comprising said filter at a 435 nanometer-wavelength for the angle of incidence $\theta'$ and
    for an angle of incidence ranging from 0° to 15°, a parameter $\Delta_{spectral}$ defined by the relation $\Delta_{spectral}=1-[R_{0°-15°}(480\ nm)/R_{0°-15°}(435\ nm)]$, in such a way that this parameter $\Delta_{spectral}$ is higher than or equal to 0.8, where
        $R_{0°-15°}(480\ nm)$ represents the reflectivity value of the front main face at a 480 nanometer-wavelength for the relevant incidence, and
        $R_{0°-15°}(435\ nm)$ represents the reflectivity value of the front main face at a 435 nanometer-wavelength for the relevant incidence.

Thus, the ophthalmic lens of the invention makes it possible to minimize the phototoxic blue light transmission to the retina of a user wearing such an ophthalmic lens, as a result of, to the one hand, its average reflectivity within a wavelength range of from 420 nm to 450 nanometers and, to the other hand, its angular selectivity.

Indeed, the ophthalmic lens provided with said filter, at a given wavelength, has an essentially different reflectivity for two essentially different angles of incidence on the main face comprising said filter.

Moreover, this filter is off-centered as compared to the phototoxic blue light wavelength band, which does range from 420 nanometers to 450 nanometers. Indeed, the ophthalmic lens has a maximum reflectivity at a wavelength lower than 435 nanometers. This makes it then possible to adjust the angular selectivity of the lens.

The spectral characteristics (reflectivity, $R_m$, $R_v$, ...) of each main face of an ophthalmic lens of the invention are determined classically for an incident light beam striking the main face from air, without having gone through the substrate.

Finally, an ophthalmic lens of the invention having a parameter $\Delta(\theta,\theta')$ such as defined hereabove makes it possible to:

- maximize the reflection of the phototoxic blue light originating from the front main face side, the intensity of this reflection depending on the measurable value $R_\theta(435\ nm)$, and
- minimize the reflection of the phototoxic blue light originating from the back main face side, the intensity of this reflection depending on the measurable value $R_{\theta'}(435\ nm)$.

Thus, the ophthalmic lens of the invention, provided with its filter, reduces the phototoxic blue light global transmission to the retina of a user wearing such an ophthalmic lens.

The provided filter having a greater full width at half maximum as compared to a narrow-band filter, it proves to be thinner than such a narrow-band filter and has not so many layers, and, as a consequence, is easier and cheaper to produced as compared to a narrow-band filter.

Moreover, other advantageous and non-limiting characteristics of the ophthalmic lens of the invention are as follows:
- the filter is formed on the front main face of the ophthalmic lens;
- the parameter $\Delta(\theta,\theta')$ is defined for an angle of incidence $\theta$ on the main face comprising said filter such that $\theta=15°$ and for an angle of incidence $\theta'$ on the main face comprising said filter such that $\theta'=45°$;
- the parameter $\Delta_{spectral}$ is defined for an angle of incidence of 15°;
- the parameter $\Delta(\theta,\theta')$ is higher than or equal to 0.65, more preferably higher than or equal to 0.7, even more preferably higher than or equal to 0.75, and most preferably higher than or equal to 0.8;
- the maximum reflectivity is observed at a wavelength lower than or equal to 410 nm, more preferably lower than or equal to 400 nm, and even more preferably, lower than or equal to 390 nm;
- the maximum reflectivity is observed at a wavelength higher than or equal to 350 nanometers, preferably within the wavelength range of from 360 nm to 400 nm, more preferably within the wavelength range of from 370 nm to 390 nm;
- the full width at half maximum is higher than or equal to 90 nanometers, preferably higher than or equal to 100 nanometers;
- the full width at half maximum is lower than or equal to 150 nanometers, preferably lower than or equal to 120 nanometers, more preferably lower than or equal to 110 nm.

Thus, the full width at half maximum does generally range from 80 nm to 150 nm, preferably from 90 nm to 120 nm, more preferably from 90 nm to 110 nm and even more preferably from 100 nm to 110 nm.

Finally, other advantageous and non-limiting characteristics of the ophthalmic lens of the invention are as follows:
- the reflectivity value at the maximum level of reflectivity of the main face comprising the filter, for an angle of incidence of 15°, is preferably at least 1.5 times higher, more preferably at least 2 times higher and most preferably at least 2.5 times higher than the reflectivity value of the same main face, for the same angle of incidence, and at a wavelength of 435 nm;
- the ratio $[R_{15°}(435\ nm)-R_{15°}(480\ nm)]/R_{15°}(435\ nm)$, where $R_{15°}(435\ nm)$ and $R_{15°}(480\ nm)$ do respectively represent the reflectivity of the main face of the ophthalmic lens comprising said filter at a wavelength of 435 nm and at a wavelength of 480 nm, for an angle of incidence on this main face of 15°, is higher than or equal to 0.8, more preferably higher than or equal to 0.85 and even more preferably higher than or equal to 0.9. This ratio does express the outstanding selectivity of the filter provided on the ophthalmic lens of the invention which enables to protect the phototoxic band without disturbing the chronobiologic band;
- the average luminous reflectance factor ($R_v$) on the main face of the ophthalmic lens comprising the filter is lower than or equal to 2.5%, preferably lower than or equal to 1.5%;
- the average luminous reflectance factor ($R_v$) on each of the main faces of the ophthalmic lens is lower than or equal to 2.5%, preferably lower than or equal to 1.5%;
- the average luminous reflectance factor ($R_v$) on the main face of the ophthalmic lens comprising the filter is lower than or equal to 0.7%;
- the filter is formed on the front main face of the ophthalmic lens and the average reflectance factor (unweighted) within the ultraviolet range (UV) ranging from 300 nm to 380 nm, for an angle of incidence on this front main face of 15°, is higher than or equal to 15%, more preferably higher than or equal to 20% and even more preferably higher than or equal to 25%;
- the filter is an interference filter;
- the filter comprises a number of layers lower than or equal to 11, preferably ranging from 2 to 10 layers, and more preferably from 4 to 9 layers and even more preferably from 4 to 7 layers;
- the filter has a total thickness lower than or equal to 700 nanometers, preferably lower than or equal to 600 nanometers, and even more preferably lower than or equal to 550 nm, and most preferably ranging from 200 nm to 400 nm;
- the back main face of the ophthalmic lens comprises an UV-coating, that is to say a coating poorly reflecting the UV radiation, preferably an antireflection coating efficient in both the ultraviolet and the visible portions of the spectrum.

Moreover, the ophthalmic lens of the invention advantageously contributes to the production of spectacles.

Thus, the present invention also provides spectacles comprising at least one ophthalmic lens of the invention.

In one of its aspects, the present invention is aimed at using the ophthalmic lens of the invention to increase the contrast in the visual perception of a wearer. Thus, the use of lenses according to the invention enables the improvement of the comfort of vision of the wearer, and especially to recognize more easily objects or persons observed through such ophthalmic lenses. This use is interesting for any person, in particular for a healthy person who has no ocular diseases or predisposition to such a disease.

Moreover, the use of an ophthalmic lens of the invention reveals to be particularly interesting for a therapeutic use or to prevent diseases related to blue light-induced phototoxicity.

The present invention is also aimed at using the ophthalmic lens of the invention to reduce the risks of occurrence of an ophthalmic disease due to a degenerative process related to the phototoxic blue light.

The invention finally provides the use of an ophthalmic lens of the invention to protect against the blue light-induced phototoxicity at least part of the wearer's eye, in particular against a degenerative process such as age-related macular degeneration (ARMD).

BRIEF DESCRIPTION OF THE DRAWING FIGURES

The invention will be described in more details by referring to the appended figures, amongst which ophthalmic lenses are provided with a filter according to the invention on their front main face.

DETAILED DESCRIPTION OF THE INVENTION

As is well known, the ophthalmic lens of the invention comprises a transparent substrate made of organic or mineral glass. This substrate may comprise one or more functional coatings to provide the ophthalmic lens with particular optical and/or mechanical properties, such as, for example, an impact-resistant coating, an abrasion-resistant coating, an anti-reflection coating, an UV-coating, an antistatic coating, a polarizing coating, and an anti-fouling and/or anti-fogging coating. All these coatings are well known in the ophthalmic lenses art.

The ophthalmic lens substrate of the invention is preferably in organic glass, for example in a thermoplastic or a thermosetting plastic material.

To be mentioned as thermoplastic materials to be suitably used for the substrates are (meth)acrylic (co)polymers, in particular poly(methyl methacrylate) (PMMA), thio(meth)acrylic (co)polymers, polyvinylbutyral (PVB), polycarbonates (PC), polyurethanes (PU), poly(thiourethanes), polyol allylcarbonate (co)polymers, ethylene/vinylacetate thermoplastic copolymers, polyesters such as poly(ethylene terephthalate) (PET) or poly(butylene terephthalate) (PBT), polyepisulfides, polyepoxides, copolymers of polycarbonates and polyesters, copolymers of cycloolefins such as copolymers of ethylene and norbornene or ethylene and cyclopentadiene, and their combinations.

As used herein, a (co)polymer is intended to mean a copolymer or a homopolymer. A (meth)acrylate is intended to mean an acrylate or a methacrylate. As used herein, a polycarbonate (PC) is intended to mean both homopolycarbonates and copolycarbonates and block copolycarbonates.

Most particularly recommended substrates include those substrates obtained through (co)polymerization of diethyleneglycol bis allyl carbonate, sold, for example, under the trade name CR-39® by the company PPG Industries (ORMA® lenses ESSILOR), or through polymerization of thio(meth)acrylic monomers, such as those described in the French patent application FR 2734827. The substrates may be obtained through polymerization of the hereabove mixtures of monomers, or may also comprise mixtures of such polymers and (co)polymers.

Polycarbonates are other preferred substrates.

The ophthalmic lens has a front main face and a back main face.

As used herein, a back main face is intended to mean the main face which, in use, is the closest to the wearer's eye. It is generally a concave face. Conversely, a front main face is intended to mean the main face which, in use, is the most distant from the wearer's eye. It is generally a convex face.

According to the present invention, at least one of both main faces of the ophthalmic lens comprises a filter.

As previously mentioned, the ophthalmic lens substrate may comprise various coatings either on the front main face of the ophthalmic lens, or on the back main face thereof.

A coating, which is said to be "on" the substrate or which has been deposited "onto" the substrate is defined as a coating, which:

(i) is located over a main face of the substrate, (ii) is not necessarily in contact with the substrate, that is to say one or more intermediate coatings may be interleaved in between the substrate and the relevant coating, and (iii) does not necessarily completely cover the main face of the substrate.

When "a layer A is located under a layer B", it should be understood that the layer B is more distant from the substrate than the layer A.

In an embodiment, the filter is directly formed on the front main face of the ophthalmic lens.

In another preferred embodiment, it is directly deposited onto an anti-abrasion coating and/or a scratch-resistant coating, having been itself deposited onto the front main face of the ophthalmic lens.

Prior to depositing the filter, it is common to submit the surface of said substrate, to a physical or chemical activating treatment, which is intended to increase the adherence of the filter to the main face(s).

Such pre-treatment is generally conducted under vacuum. It may come as a bombardment with energetic species, for instance an ion beam ("Ion Pre-Cleaning" or "IPC"), or an electron beam, a treatment through corona discharge, an ion spallation, an UV treatment or a plasma treatment under vacuum, generally with oxygen or argon. It may also come as a surface treatment using an acid or a base and/or solvents (water or organic solvent).

In the present application, the spectral reflectivity of the ophthalmic lens, for a given angle of incidence of the face comprising said filter, represents the variation of the reflectivity (i.e. reflectance factor) at this angle of incidence depending on the wavelength. The spectral reflectivity curve does correspond to a schematic illustration of the spectral reflectivity, in which spectral reflectivity is plotted as ordinate and wavelength as abscissa. The spectral reflectivity curves may be measured by means of a spectrophotometer, for example a spectrophotometer Perkin Elmer Lambda 850 fitted with URA (Universal Reflectance Accessory).

The average reflectance factor, abbreviated $R_m$, is such as defined in the standard ISO 13666:1998, and measured according to the standard ISO 8980-4 (at an angle of incidence of less than 17°, typically of 15°), that is to say it represents the spectral reflectivity (unweighted) average within the whole light spectrum of from 400 nm to 700 nm.

In the same way, the luminous reflectance factor, abbreviated $R_v$, also called "average luminous reflectance factor" in the present application is such as defined in the standard ISO 13666:1998, and measured according to the standard ISO 8980-4 (at an angle of incidence of less than 17°, typically of 15°), that is to say it represents the spectral reflectivity weighted average within the whole visible light spectrum ranging from 380 nm to 780 nm.

By analogy, an average blue reflectance factor is defined between 420 nm and 450 nm, abbreviated $R_{m,B}$, which does correspond to the spectral reflectivity (unweighted) average within the wavelength range of from 420 nm to 450 nm.

According to the invention, the average blue reflectance factor $R_{m,B}$ may be measured for an angle of incidence on the main face comprising the filter ranging from 0° (normal incidence) to 15°, preferably at 15°.

It should further be noted in the present application, that:

$R\theta(435\ nm)$ is the reflectivity value of the main face of the ophthalmic lens comprising the filter according to the present invention, this value being determined (through measurement or calculation) at a wavelength of 435 nanometers and for an angle of incidence θ on the main face comprising the filter ranging from 0° to 15°, and $R_{\theta'}(435\ nm)$ is the reflectivity value of the main face of the ophthalmic lens comprising the filter according to the present invention, this value being determined (through measurement or calculation) at a wavelength of 435 nanometers and for an angle of incidence θ' on the main face comprising the filter ranging from 30° to 45°.

A parameter $\Delta(\theta,\theta')$ will be defined thereafter using the following relation: $\Delta(\theta,\theta')=1-[R_{\theta'}(435\ nm)/R_{\theta}(435\ nm)]$. It will be explained hereafter in the following specification how this parameter $\Delta(\theta,\theta')$ may be used to evaluate the capacity of the ophthalmic lens to limit the amount of phototoxic blue light striking the retina of a wearer, by respectively taking into account the respective contributions of blue light originating from the front face side or from the back face side of the lens.

According to the present invention, the filter provides the main face of the ophthalmic lens comprising the filter with the ability to present, for an angle of incidence on this main face ranging from 0° to 15°, an average blue reflectance factor $R_{m,B}$ which is higher than or equal to 5%.

The filter is thus especially designed to maximize the average blue reflectance factor $R_{m,B}$. This makes it possible to maximize the rejection of phototoxic blue light, within the wavelength range of from 420 nm to 450 nm, directly arriving on the front main face of the lens. It is considered herein that the major part of the direct light originating from the front of the ophthalmic lens wearer and reaching the retina of the same has a low incidence on the front main face, generally ranging from 0° to 15°.

In a preferred embodiment of the present invention, the average blue reflectance factor $R_{m,B}$, for an angle of incidence on the main face of the ophthalmic lens comprising the filter ranging from 0° to 15°, preferably of 15°, is higher than or equal to 10%, more preferably higher than or equal to 20%, and even more preferably higher than or equal to 30%, and most preferably higher than or equal to 50%.

According to the present invention, the filter further provides the main face comprising the filter with the ability to present a spectral reflectivity curve for an angle of incidence on this main face ranging from 0° to 15°, preferably of 15°, which presents:

a maximum reflectivity at a wavelength of less than 435 nanometers, and a full width at half maximum (FWHM) higher than or equal to 80 nanometers.

Figure 1:
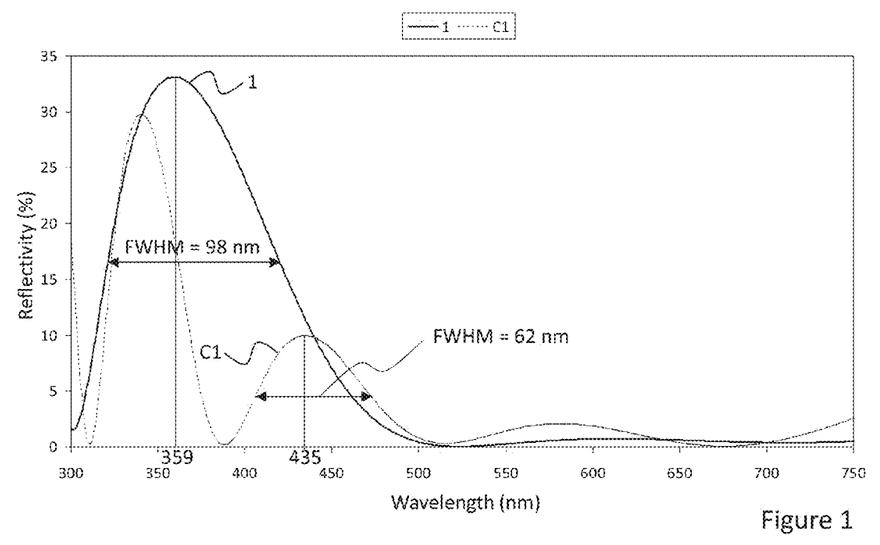
FIGS. 1 to 3 show the spectral reflectivity curves for an angle of incidence on the front main face of 15°, of some ophthalmic lenses prepared in Examples 1 to 3 of the present application and of ophthalmic lenses coated with a filter not fulfilling the characteristics of the filters of the present invention, especially the full width at half maximum (see Comparative examples C1, C2, and C3).
Figure 2:
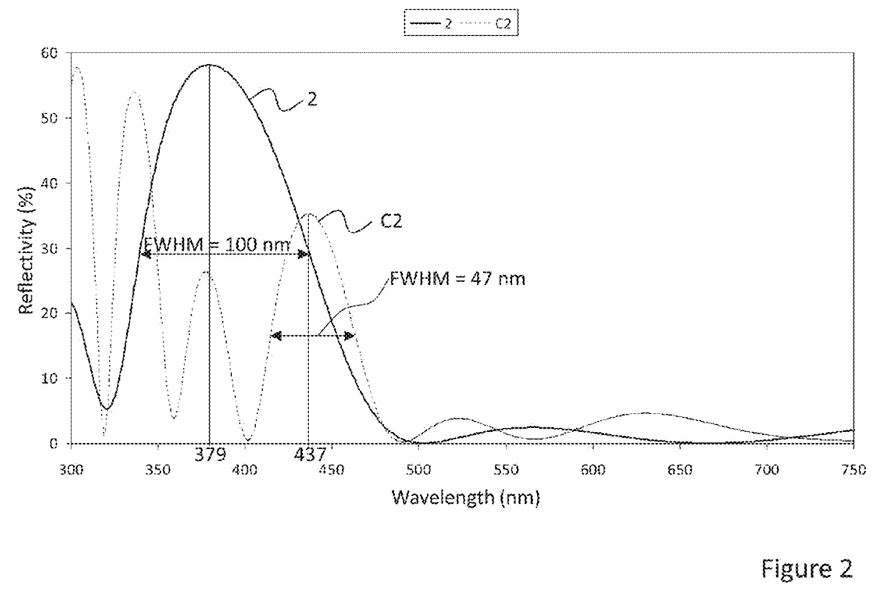
Figure 3:
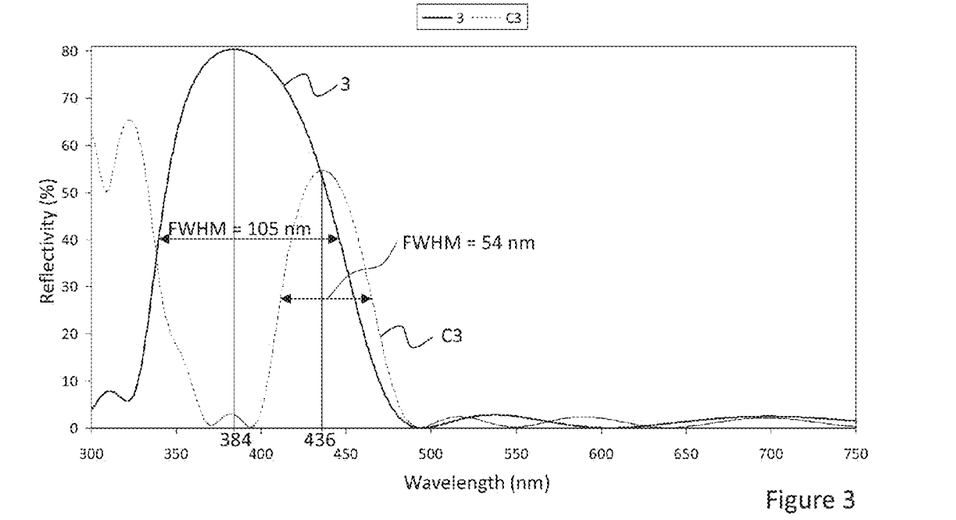

Indeed, as can be seen on FIGS. 1 to 3, the spectral reflectivity curves of the front main face of the ophthalmic lenses of the invention, generally have, within the wavelength range of from 380 nm to 500 nm, a "bell form" which can be characterized through its height (maximum reflectivity) and its full width at half maximum (FWHM).

According to the present invention, the maximum reflectivity is obtained for a wavelength lower than 435 nm. It is thus shifted as compared to the central wavelength (435 nm) of the wavelength band between 420 nm and 450 nm of phototoxic blue light.

Preferably, the maximum reflectivity is observed at a wavelength lower than or equal to 410 nm, more preferably lower than or equal to 400 nm and even more preferably lower than or equal to 390 nm.

In a preferred embodiment, such shift is limited so that the maximum reflectivity is also at a wavelength higher than or equal to 350 nm. Preferably, the maximum reflectivity is observed at a wavelength higher than 360 nm, more preferably higher than or equal to 370 nm.

According to the present invention, the full width at half maximum of the relevant spectral reflectivity curve, for an angle of incidence on the main face comprising the filter ranging from 0° to 15° is higher than or equal to 80 nm.

A filter sized up so that the spectral reflectivity curve for an angle of incidence on the main face comprising the filter ranging from 0° to 15° has a full width at half maximum (FWHM) higher than or equal to 80 nanometers, will be thereafter referred to as a large filter.

In a preferred embodiment, the full width at half maximum is higher than or equal to 90 nanometers, preferably higher than or equal to 100 nanometers.

Also preferably, the full width at half maximum is lower than 150 nanometers, more preferably lower than 120 nanometers, even more preferably lower than 110 nm.

Still according to the present invention, the filter finally provides the main face of the ophthalmic lens comprising the filter with the ability to present a parameter $\Delta(\theta,\theta')$, such as previously defined, higher than or equal to 0.6.

Such as previously defined, the parameter $\Delta(\theta,\theta')$ depends both on the reflectivity at 435 nm for an angle of incidence θ on the main face ranging from 0° to 15°, abbreviated $R_{\theta}(435\ nm)$, and on the reflectivity at 435 nm for an angle of incidence θ' on the main face ranging from 30° to 45°, abbreviated $R_{\theta'}(435\ nm)$.

In the case of an ophthalmic lens of the invention placed in front of the wearer's eye, as explained in the introducing part, it should be understood that the amount of phototoxic blue light within the wavelength range of from 420 nm to 450 nm directly arriving on the front main face of the ophthalmic lens and reaching the wearer's eye does conversely vary as compared to the measurable value $R_{\theta}(435\ nm)$.

In the same manner, the amount of phototoxic blue light within the wavelength range of from 420 nm to 450 nm indirectly arriving from the wearer's background and reflected by the ophthalmic lens does vary in the same way as the measurable value $R_{\theta'}(435\ nm)$.

Thus, by choosing a parameter $\Delta(\theta,\theta')$ such as $\Delta(\theta,\theta') \geq 0.6$, an ophthalmic lens is obtained with an efficient filter, optimized against phototoxic blue light. Indeed, the parameter $\Delta(\theta,\theta')$ will increase all the more that:

(i) the reflectivity value $R_{\theta'}(435\ nm)$ is low, i.e. that the amount of phototoxic blue light coming from the wearer's background and reflected by the ophthalmic lens in the direction of the wearer's retina is low, and that (ii) the reflectivity value $R_{\theta}(435\ nm)$ is high, i.e. that the amount of phototoxic blue light directly arriving on the front main face of the ophthalmic lens and reflected by the same is high.

In a preferred embodiment, the parameter $\Delta(\theta,\theta')$ of the ophthalmic lens provided with a large filter according to the invention is higher than or equal to 0.7, more preferably higher than or equal to 0.75, and even more preferably higher than or equal to 0.8.

Preferably, the parameter $\Delta(\theta,\theta')$ is determined for an angle of incidence $\theta$ essentially equivalent to 15° and an angle of incidence $\theta'$ essentially equivalent to 45°.

Preferably, the average transmission factor in the blue region between 465 nm and 495 nm of the ophthalmic lens of the invention (for an angle of incidence on the front main face ranging from 0° to 15°), which does correspond to the spectral transmittance (unweighted) average within the wavelength range of from 465 nm to 495 nm, is higher than or equal to 80%, more preferably higher than or equal to 85%, and even more preferably higher than or equal to 90%.

This makes it especially possible to ensure that the major part of blue light with a wavelength ranging from 465 nm to 495 nm, which would be responsible for the synchronization of the biological clock, would be transmitted to the eye of a wearer using this ophthalmic lens.

Preferably, the ophthalmic lens transmission factor at 480 nm for an angle of incidence on the front main face ranging from 0° to 15° is higher than or equal to 70%, more preferably higher than or equal to 90%, and even more preferably higher than or equal to 95%.

In a preferred embodiment of the present invention, the filter deposited onto the lens is an interference filter. As used herein, such a filter is intended to mean a filter comprising at least one layer formed on one of the main faces of the ophthalmic lens provided with the interference filter, this layer having a refractive index which is different by at least 0.1 unit from the substrate refractive index. The optical properties of such a filter, such as for example reflectivity, result from interferences due to the multiple reflections at the air/layer and substrate/layer interfaces.

A layer in the filter is defined as having a deposited thickness higher than or equal to 1 nm. Thus, any layer having a thickness lower than 1 nm will not be accounted in the number of layers present in the filter. An optional sublayer interleaved in between the filter and the substrate will not either be taken into account in the number of layers present in the interference filter.

Unless otherwise specified, all layer thicknesses disclosed in the present application are physical thicknesses, not optical thicknesses.

Should the interference filter of the invention comprise at least two layers, it would then comprise a stack of at least one layer with a high refractive index, or "high index-layer", referred to as HI layer, and of at least one layer with a low refractive index, or "low index-layer", referred to as LI layer.

In a preferred embodiment, the interference filter comprises less than 11 layers, preferably it has a number of layers ranging from 2 to 10 layers, more preferably from 4 to 9 layers, most preferably from 4 to 7 layers. HI and LI layers do not need to alternate within the interference filter stack, although they also may in an embodiment of the invention. Two HI layers (or more) may be deposited onto each other, as well as may two LI layers (or more).

In the present application, a layer of the interference filter is said to be a "layer with a high refractive index" when the refractive index thereof is higher than 1.60, preferably higher than or equal to 1.65, more preferably higher than or equal to 1.70, even more preferably higher than or equal to 1.80 and most preferably higher than or equal to 1.90. In the same way, a layer of the interference filter is said to be a layer with a low refractive index when the refractive index thereof is lower than 1.50, preferably lower than or equal to 1.48, more preferably lower than or equal to 1.47.

Unless otherwise stated, the refractive indexes disclosed in the present application are expressed at a temperature of 25° C. and for a reference wavelength of 550 nm.

The HI layer is a traditional layer with a high refractive index, well known from the person skilled in the art. It generally comprises one or more mineral-type oxides such as, but with no limitation: zirconia ($ZrO_2$), titanium oxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium pentoxide ($Nb_2O_5$), or yttrium oxide ($Y_2O_3$). Optionally, HI layers may also contain silica or other materials with a low refractive index, as long as their refractive index is higher than 1.60 as indicated hereabove. Preferred materials include $TiO_2$, $PrTiO_3$, $ZrO_2$, $Al_2O_3$, $Y_2O_3$ and combinations thereof.

The LI layer is also a traditional, well-know, layer with a low refractive index and may comprise, with no limitation: silica ($SiO_2$), or a mixture of silica and alumina, in particular of silica doped with alumina, the latter contributing to increase the thermal resistance of the interference filter. The LI layer is preferably a layer comprising at least 80% by weight of silica, more preferably at least 90% by weight of silica, as compared to the LI layer total weight, and even more preferably consists in a silica layer.

Optionally, low-index layers may further contain materials with a high refractive index, as long as the refractive index of the resulting layer is lower than 1.50.

Should a LI layer be used, comprising a mixture of $SiO_2$ and $Al_2O_3$, it preferably comprises 1 to 10%, more preferably 1 to 8% and even more preferably 1 to 5% by weight of $Al_2O_3$ as compared to the silica+alumina total weight in this layer.

For example, $SiO_2$ layers doped with 4% $Al_2O_3$ by weight, or less, or a $SiO_2$ layer doped with 8% $Al_2O_3$ may be used. Mixtures of $SiO_2/Al_2O_3$ available on the market may be used, such as LIMA® marketed by UMICORE MATERIALS AG (refractive index ranging from 1.48 to 1.50), or L5® marketed by MERCK KGaA (refractive index 1.48, wavelength 500 nm).

The outer layer of the interference filter is generally a low index-layer, typically based on silica, comprising preferably at least 80% by weight of silica, more preferably at least 90% by weight of silica (for example a layer of silica doped with alumina), as compared to the total weight of this outer layer, and even more preferably consists in an outer layer of silica.

In a preferred embodiment, the filter has a total thickness lower than or equal to 700 nanometers, more preferably lower than or equal to 600 nm. The filter total thickness is generally higher than 200 nm, preferably higher than 250 nm.

In particular embodiments of the invention, where the filter is an interference filter comprising 8 or 9 layers, the stack total thickness does preferably range from 450 nm to 600 nm.

In particular embodiments of the invention, where the filter is an interference filter comprising 6 or 7 layers, the stack total thickness is preferably lower than 500 nm, more preferably it does range from 300 nm to 500 nm.

In particular embodiments of the invention, where the filter is an interference filter comprising 4 or 5 layers, the stack total thickness is preferably lower than 300 nm, more preferably it does range from 200 nm to 300 nm.

As a rule, HI layers have a physical thickness ranging from 10 nm to 100 nm, more preferably lower than or equal to 80 nm, and even more preferably lower than or equal to 70 nm, and LI layers have a physical thickness ranging from 10 nm to 150 nm, more preferably lower than or equal to 135 nm, and even more preferably lower than or equal to 120 nm.

The ophthalmic lens of the invention may also be rendered antistatic, that is to say may not retain and/or develop any substantial electrostatic charge, thanks to the incorporation of at least one electro-conductive layer in the filter.

Preferably, there is an additional layer of a conducting oxide such as indium oxide, tin oxide, ITO (Indium Tin Oxide). This layer has a thickness that is generally lower than 20 nm, preferably between 5 nm and 15 nm.

It is preferably adjacent to a layer with a high refractive index such as a zirconium oxide layer.

Preferably, this conductive layer is located under the last low index-layer of the filter (that is to say the layer that is the closest to the air), generally based on silica.

In an embodiment of the invention, the filter is deposited onto a sublayer. It should be understood here that this filter sublayer does not belong to the filter.

As used herein, a filter sublayer, or an adhesion layer, is intended to mean a coating having a relatively high thickness, used in order to improve the mechanical properties such as the abrasion resistance and/or the scratch resistance of the filter and/or to promote its adhesion to the substrate or to the underlying coating.

Given its relatively high thickness, the sublayer does generally not take part in the filtering optical activity of the filter, in particular in such situations where it has a refractive index close to that of the underlying coating (which is generally the abrasion-resistant coating and/or the scratch-resistant coating) or to that of the ophthalmic lens substrate, when the sublayer is directly deposited onto the ophthalmic lens substrate.

The sublayer should be thick enough to promote the abrasion resistance of the filter, but preferably not to the point where a light absorption could occur, which, depending on the nature of the sublayer, could significantly reduce the visual transmission factor $T_v$ such as defined in the standard ISO 13666:1998, and measured according to the standard ISO 8980-3.

The thickness of this sublayer is generally lower than 300 nm, more preferably lower than 200 nm, and is generally higher than 90 nm, more preferably higher than 100 nm.

The sublayer preferably comprises a $SiO_2$-based layer comprising preferably at least 80% by weight of silica, more preferably at least 90% by weight of silica, as compared to the sublayer total weight, and even more preferably consists in a sublayer of silica. The thickness of this sublayer based on silica is generally lower than 300 nm, more preferably lower than 200 nm, and is generally higher than 90 nm, more preferably higher than 100 nm.

In another embodiment, this $SiO_2$-based sublayer is an alumina-doped silica sublayer according to the hereabove given proportions, and preferably consists in a layer of silica doped with alumina.

In a particular embodiment, the sublayer consists in a $SiO_2$ layer.

It is preferred to use a sublayer of the monolayer type. However, the sublayer may be laminated (multilayer), especially when the sublayer and the underlying coating (or the substrate, should the sublayer be directly deposited onto the substrate) have a substantial difference between their respective refractive indexes. This is especially true when the underlying coating, which is generally an abrasion-resistant coating and/or a scratch-resistant coating, or the substrate, have a high refractive index, in other words a refractive index higher than or equal to 1.55, preferably higher than or equal to 1.57.

In such an event, the sublayer may comprise, in addition to a layer having a thickness ranging from 90 nm to 300 nm, which is referred to as the main layer, preferably at most three other layers, more preferably at most two other layers, interleaved in between the optionally coated substrate and that layer with a thickness ranging from 90 nm to 300 nm, which is generally a layer based on silica. Such additional layers are preferably thin layers, the function of which is to limit the multiple reflections at the sublayer/underlying coating interface or at the interface sublayer/substrate interface, whichever applies.

A multilayered sublayer comprises preferably, in addition to the main layer, a layer with a high refractive index and with a thickness lower than or equal to 80 nm, more preferably lower than or equal to 50 nm and even more preferably lower than or equal to 30 nm. This layer with a high refractive index does directly contact the substrate with a high refractive index or the underlying coating with a high refractive index, whichever applies. Of course, this embodiment may be used even if the substrate (or the underlying coating) has a refractive index of less than 1.55.

As an alternative, the sublayer comprises, in addition to the main layer and the previously mentioned layer with a high refractive index, a layer of material with a refractive index lower than or equal to 1.55, preferably lower than or equal to 1.52. more preferably lower than or equal to 1.50 based on $SiO_2$ (that is to say comprising preferably at least 80% by weight of silica) with a thickness lower than or equal to 80 nm, more preferably lower than or equal to 50 nm and even more preferably lower than or equal to 30 nm, onto which is deposited said high refractive index layer. Typically, in this case, the sublayer comprises, deposited in this order onto the optionally coated substrate, a 25 nm-thick layer of $SiO_2$, a 10 nm-thick layer of $ZrO_2$ or of $Ta_2O_5$ and the sublayer main layer.

The filter and the optional sublayer are preferably deposited by deposition under vacuum according to any of the following methods: i) by evaporation, optionally under ionic assistance; ii) by ion beam sputter deposition; iii) by cathode sputtering; iv) by plasma-assisted vapor phase deposition. These various methods are described in "*Thin Film Processes*" and "*Thin Film Processes II*" (Vossen & Kern Edition, Academic Press, 1978 and 1991 respectively). A particularly recommended method is the vacuum evaporation process.

Preferably, when the filter is an interference filter, the deposition of each of the layers of the filter stack and of the optional sublayer is effected through evaporation under vacuum.

In a particular embodiment of the present invention, the ophthalmic lens has an average luminous reflectance factor $R_v$ on the main face of the ophthalmic lens comprising the filter which is lower than or equal to 2.5%. Preferably, the average luminous reflectance factor $R_v$ is lower than or equal to 2%, even more preferably lower than or equal to 1.5%. In a particularly preferred embodiment, the average luminous reflectance factor $R_v$ is lower than or equal to 0.7%, more preferably lower than or equal to 0.6%.

In a preferred embodiment, the ophthalmic lens has an average luminous reflectance factor $R_v$ on each of the main faces of the ophthalmic lens which is lower than or equal to 2.5%. More preferably, this average luminous reflectance factor $R_v$ is lower than or equal to 0.7%.

In a preferred embodiment of the invention, the main face coated with the filter according to the invention is the front main face of the ophthalmic lens of the invention and the back main face is coated with a traditional antireflection coating or preferably an antireflection coating efficient within the UV region, that is to say less reflecting the UV radiation, such as those described for example in the document PCT/EP2011/072386.

The average reflectance factor within the UV region $R_{UV}$ on the back main face of the ophthalmic lens, for wavelengths ranging from 280 nm to 380 nm, weighted by the function $W(\lambda)$ defined in the standard ISO 13666:1998, is lower than or equal to 7%, more preferably lower than or equal to 6%, and even more preferably lower than or equal to 5%, for an angle of incidence of 30° and for an angle of incidence of 45°. The average reflectance factor within the UV region $R_{UV}$ is defined by the relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ represents the spectral reflectivity on the back main face of the ophthalmic lens at the relevant wavelength, and $W(\lambda)$ represents a weighting function that is equal to the product of solar spectral irradiance $Es(\lambda)$ and relative spectral efficiency function $S(\lambda)$.

The spectral function $W(\lambda)$, which enables to calculate the UV radiation transmission factors is defined in the standard ISO 13666:1998.

The antireflection coating efficient within the UV region preferably comprises a stack of at least one layer with a high refractive index and of at least one layer with a low refractive index.

In another embodiment of the present invention, both front and back main faces each present a filter against phototoxic blue light. The two filters thus formed, for the one on the front main face and for the other on the back main face, may then be the same or different.

The filter according to the invention may be directly deposited onto a bare substrate. In some applications, it is preferred that the main face of the ophthalmic lens comprising the filter be coated with one or more functional coatings prior to forming the filter on such main face. These functional coatings, which are classically used in optics, may be, with no limitation: an impact-resistant primer, an abrasion-resistant coating and/or a scratch-resistant coating, a polarized coating, a tinted coating.

As a rule, the front and/or back main face of the substrate onto which a filter will be formed is coated with an impact-resistant primer, an abrasion-resistant coating and/or a scratch-resistant coating.

The filter is preferably deposited onto an abrasion-resistant coating and/or a scratch-resistant coating. The abrasion-resistant coating and/or the scratch-resistant coating may be any layer classically used as an abrasion-resistant coating and/or a scratch-resistant coating in the ophthalmic lenses field. Such coatings are described, amongst others, in the document EP 0614957.

The ophthalmic lens of the invention may also comprise coatings formed on the filter and able to modify the surface properties thereof, such as hydrophobic and/or oleophobic coatings (anti-fouling "top coat") and/or anti-fogging coatings. Such coatings are described, amongst others, in the document U.S. Pat. No. 7,678,464. These coatings are preferably deposited onto the outer layer of the filter. Their thickness is generally lower than or equal to 10 nm, preferably ranging from 1 nm to 10 nm, more preferably ranging from 1 nm to 5 nm.

Typically, an ophthalmic lens of the invention comprises a substrate, which has been successively coated on the front main face thereof with an impact-resistant primer layer, an abrasion-resistant layer and/or a scratch-resistant layer, a filter according to the present invention, and a hydrophobic and/or oleophobic coating.

The ophthalmic lens of the invention is preferably an ophthalmic lens for spectacles, or an ophthalmic lens blank. The invention thus further relates to spectacles comprising at least one such ophthalmic lens.

Said ophthalmic lens may be a polarized lens, or a solar, tinted lens, with a corrective action or not.

The back main face of the substrate of the optical article may be successively coated with an impact-resistant primer layer, an abrasion-resistant coating and/or a scratch-resistant coating, an antireflection coating which may be, or not, an UV-antireflection coating, and with a hydrophobic and/or oleophobic coating.

Such a lens is particularly advantageous for protecting against blue light-induced phototoxicity a wearer's eye suffering from a deterioration process, in particular from a degenerative process such as the age-related macular degeneration.

An ophthalmic lens such as described hereabove does also advantageously provide the wearer with an improved visual contrast.

The following examples illustrate the invention in a more detailed, although non-limiting manner.

EXAMPLES

1. General Processes and Procedures

The filters according to the invention are deposited onto ORMA® lenses coated with an abrasion-resistant coating such as described in the Example 3 of the European patent EP/614957.

The evaporating device and the conditions for depositing the $SiO_2$ and $ZrO_2$ layers (evaporation rate, pressure) are such as described in the patent application WO 2008/107325.

2. Calculation of the Curves

The spectral reflectivity curves of the filters according to the invention have been modelized from the software Essential Mac Leod (version 9.4) of Thin Film Center.

The characteristics of the filters and their properties are given at point 3 hereunder.

The ophthalmic lenses fitted with the filters of examples 1 and 2 have been effectively prepared and the spectral reflectivity curves have been measured.

It has been controlled that the obtained curves did correspond to the modelized curves.

3. Filter Stacks and Properties. Spectral Reflectivity Curves. Results

The structural characteristics and the optical performances of the ophthalmic lenses obtained in Examples 1 to 3 are detailed hereunder.

The spectral reflectivity curves at an angle of incidence on the front main face of 15° and for wavelengths ranging from 280 nm to 780 nm of the hereabove Examples 1 to 3 are illustrated on FIGS. 1 to 3. Also shown on these figures are the spectral reflectivity curves of Comparative examples C1, C2, and C3 (see below).

The average reflectance factor values are those of the front main face. The factors $R_{m,B}$ and $R_v$ are indicated for an angle of incidence of 15°.

| Ex. 1: 4-layer large filter on the front main face ||
|---|---|
| Substrate + hard coat ||
| ZrO2 | 34 nm |
| SiO2 | 35 nm |
| ZrO2 | 73 nm |
| SiO2 | 110 nm |
| Air ||
| Total thickness | 252 nm |
| Rm, B @ 15° (420-450 nm) | 11.8% |
| Max. Reflectivity | 359 nm |
| Full width at half maximum | 98 nm |
| Δ(θ = 15°, θ' = 45°) @ 435 nm | 0.72 |
| Rm @ 15° (465-495 nm) | 2.3% |
| Δ spectral @ 15° 435 nm/480 nm | 0.85 |
| Rv @ 15° (380-780 nm) | 0.5% |

| Ex. 2: 6-layer large filter on the front main face ||
|---|---|
| Substrate + hard coat ||
| ZrO2 | 44 nm |
| SiO2 | 45 nm |
| ZrO2 | 68 nm |
| SiO2 | 32 nm |
| ZrO2 | 66 nm |
| SiO2 | 124 nm |
| Air ||
| Total thickness | 379 nm |
| Rm, B @ 15° (420-450 nm) | 30.6% |
| Max. Reflectivity | 379 nm |
| Full width at half maximum | 100 nm |
| Δ(θ = 15°, θ' = 45°) @ 435 nm | 0.75 |
| Rm @ 15° (465-495 nm) | 4.5% |
| Δ spectral @ 15° 435 nm/480 nm | 0.92 |
| Rv @ 15° (380-780 nm) | 1.9% |

| Ex. 3: 8-layer large filter on the front main face ||
|---|---|
| Substrate + hard coat ||
| ZrO2 | 47 nm |
| SiO2 | 50 nm |
| ZrO2 | 54 nm |
| SiO2 | 70 nm |
| ZrO2 | 45 nm |
| SiO2 | 62 nm |
| ZrO2 | 53 nm |
| SiO2 | 134 nm |
| Air ||
| Total thickness | 515 nm |
| Rm, B @ 15° (420-450 nm) | 51.5% |
| Max. Reflectivity | 384 nm |
| Full width at half maximum | 105 nm |
| Δ(θ = 15°, θ' = 45°) @ 435 nm | 0.80 |
| Rm @ 15° (465-495 nm) | 7.3% |
| Δ spectral @ 15° 435 nm/480 nm | 0.95 |
| Rv @ 15° (380-780 nm) | 2.0% |

In the previous table, the parameter Δ spectral @ 15° is defined by the relation: Δ spectral @ 15°=[$R_{15°}$(435 nm)−$R_{15°}$(480 nm)]/$R_{15°}$(435 nm), wherein $R_{15°}$(435 nm) and $R_{15°}$(480 nm) respectively represent the reflectivity of the front main face at 435 nm and at 480 nm, for an angle of incidence of 15° on the front main face.

It can be observed that the ophthalmic lenses of the invention have very good phototoxic blue light reflecting properties ($R_{m,B}$>10%), without being detrimental to the anti-reflection performances in the visible region ($R_v$<2.5% for an angle of incidence of) 15°.

Moreover, the ophthalmic lenses obtained in Examples 1 to 3 show outstanding transparency properties and a good colorimetric neutrality, a good resistance to abrasion and scratches and a good resistance to a hot water dip treatment followed with a mechanical stress on the surface. The coating adhesion to the substrate is also very satisfying.

Comparative Examples C1, C2, AND C3

The "anti-blue light" performances of three ophthalmic lenses provided with a filter not fulfilling the characteristics of the filters of the invention, especially as regards the full width at half maximum, are given in the tables hereunder.

It can be observed that the ophthalmic lenses provided with filters according to the invention show a better luminous reflectance factor $R_v$ than the comparative lenses, in particular filters having a limited number of layers (layer number equal to or lower than 7, preferably equal to or lower than 6).

It can be observed that all the ophthalmic lenses in Comparative examples C1, C2, and C3 which are provided with filters not fulfilling the characteristics of the filters of the invention, especially as regards the full width at half maximum, show an average blue reflectance factor $R_{m,B}$ higher than or equal to 5%.

By contrast, as can be seen on FIGS. 1 to 3, none of the Comparative examples shows ophthalmic lenses with following characteristics:
 a maximum reflectivity at a wavelength of less than 435 nm, and
 a full width at half maximum higher than or equal to 80 nm.

| Comparative ex. C1: 4-layer narrow filter on the front main face ||
|---|---|
| Substrate + hard coat ||
| ZrO2 | 45 nm |
| SiO2 | 15 nm |
| ZrO2 | 235 nm |
| SiO2 | 98 nm |
| Air ||
| Total thickness | 393 nm |
| Rm, B @ 15° (420-450 nm) | 8.5% |
| Max. Reflectivity | 435 nm |
| Full width at half maximum | 62 nm |
| Δ(θ = 0°, θ' = 45°) @ 435 nm | 0.40 |
| Rm @ 15° (465-495 nm) | 3.5% |
| Δ spectral @ 15° 435 nm/480 nm | 0.40 |
| Rv @ 15° (380-780 nm) | 1.4% |

| Comparative ex. C2: 6-layer narrow filter on the front main face ||
|---|---|
| Substrate + hard coat ||
| ZrO2 | 34 nm |
| SiO2 | 43 nm |
| ZrO2 | 315 nm |
| SiO2 | 25 nm |
| ZrO2 | 196 nm |
| SiO2 | 115 nm |
| Air ||
| Total thickness | 728 nm |
| Rm, B @ 15° (420-450 nm) | 35.0% |
| Max. Reflectivity | 437 nm |
| Full width at half maximum | Counter-pressure roll (47) nm |
| Δ(θ = 0°, θ' = 45°) @ 435 nm | 0.55 |
| Rm @ 15° (465-495 nm) | 7.5% |
| Δ spectral @ 15° 435 nm/480 nm | 0.90 |
| Rv @ 15° (380-780 nm) | 2.6% |

| Comparative ex. C3: 8-layer narrow filter on the front main face ||
|---|---|
| Substrate + hard coat ||
| ZrO2 | 163 nm |
| SiO2 | 220 nm |

-continued

| ZrO2 | 182 nm |
|---|---|
| SiO2 | 51 nm |
| ZrO2 | 47 nm |
| SiO2 | 26 nm |
| ZrO2 | 121 nm |
| SiO2 | 107 nm |
| Air | |
| Total thickness | 917 nm |
| Rm, B @ 15° (420-450 nm) | 55.0% |
| Max. Reflectivity | 436 nm |
| Full width at half maximum | 54 nm |
| Δ(θ = 0°, θ' = 45°) @ 435 nm | 0.57 |
| Rm @ 15° (465-495 nm) | 13.8% |
| Δ spectral @ 15° 435 nm/480 nm | 0.93 |
| Rv @ 15° (380-780 nm) | 2.1% |

Figure 4:
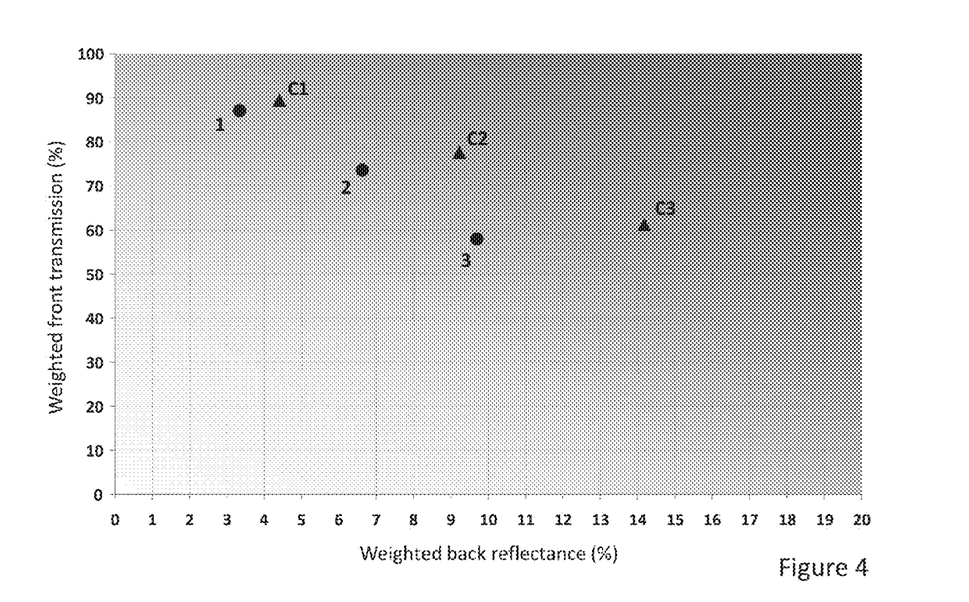
FIG. 4 shows for each of the preceding claims the weighted transmission factor (%) and the weighted back reflectivity (%), the weighting being made based on the blue light hazard function.

Moreover, the efficiency of the ophthalmic lenses of the invention of Examples 1 to 3 can be observed based on FIG. 4 as compared to the comparative examples C1, C2, and C3 described above.

The back reflectance BR(λ) and the transmission T(λ) of the optical system as a whole (with the blue filter corresponding to Examples 1, 2 and 3 and to Comparative examples C1, C2 and C3, on the front face of an ORMA® lens of the biplane type with an antireflection Crizal Forte® UV on the back face ($R_v$=0.59%, $R_{UV}$=3.1% for an incidence of 45°), have been determined by means of the software Essential Mac Leod for each of the test filters.

The calculation takes all the multiple reflections into account, which occur within the ophthalmic lens.

To evaluate the blue light-induced hazard, these transmission and reflection curves are weighted using the spectral function $W_B(\lambda)$ of the international standard ISO 8980-3. This function results from the product of blue light hazard function and spectral distribution of solar radiation function $E_S(\lambda)$ integrated within the range of wavelengths of from 380 nm to 500 nm.

Spectral Functions for the Calculation of the Light Transmission or Reflection Values within the 380-500 nm Range:

TABLE 1 numeric data for use to calculate the weighting function $W_B(\lambda)$.

| Wavelength λ (nm) | Spectral solar radiation Es(λ) (mW/m² · nm) | Blue light hazard function B(λ) | Weighting function $W_B(\lambda)$ = Es(λ) · B(λ) |
|---|---|---|---|
| 380 | 336 | 0.006 | 2 |
| 385 | 365 | 0.012 | 4 |
| 390 | 397 | 0.025 | 10 |
| 395 | 432 | 0.05 | 22 |
| 400 | 470 | 0.10 | 47 |
| 405 | 562 | 0.20 | 112 |
| 410 | 672 | 0.40 | 269 |
| 415 | 705 | 0.80 | 564 |
| 420 | 733 | 0.90 | 660 |
| 425 | 760 | 0.95 | 722 |
| 430 | 787 | 0.98 | 771 |
| 435 | 849 | 1.00 | 849 |
| 440 | 911 | 1.00 | 911 |
| 445 | 959 | 0.97 | 930 |
| 450 | 1006 | 0.94 | 946 |
| 455 | 1037 | 0.90 | 933 |
| 460 | 1080 | 0.80 | 864 |
| 465 | 1109 | 0.70 | 776 |
| 470 | 1138 | 0.62 | 706 |
| 475 | 1161 | 0.55 | 639 |
| 480 | 1183 | 0.45 | 532 |
| 485 | 1197 | 0.40 | 479 |
| 490 | 1210 | 0.22 | 266 |
| 495 | 1213 | 0.16 | 194 |
| 500 | 1215 | 0.10 | 122 |

On FIG. 4 are represented:

as abscissa: the back reflectance value weighted by the blue light hazard weighting function, for an angle of incidence on the back main face of 45°.

$$BR_B = \frac{\int_{380}^{500} W_B(\lambda) \cdot BR(\lambda) \cdot d\lambda}{\int_{380}^{500} W_B(\lambda) \cdot d\lambda}$$

wherein BR(λ) is the lens back reflectance spectral factor, and as ordinate: the transmission value weighted by the blue light hazard weighting function. This transmission value represents the part (%) of direct light that is transmitted within the blue-purple range (from 380 nm to 500 nm) through this ophthalmic lens for an angle of incidence on the front main face of 0°.

$$T_B = \frac{\int_{380}^{500} W_B(\lambda) \cdot T(\lambda) \cdot d\lambda}{\int_{380}^{500} W_B(\lambda) \cdot d\lambda}$$

wherein T(λ) is the lens spectral factor of transmission.

The measurable value $W_B(\lambda)$ represents the weighting function which is the product of spectral solar radiation Es(λ) and blue light hazard function B(λ) (see table 1).

It can be observed on FIG. 4 that Examples 1 to 3 of ophthalmic lenses according to the invention not only exhibit a lower transmission, but also a lower back reflectance, as compared to Comparative examples C1, C2, and C3, for the same number of layers.

Thus, the ophthalmic lenses of the invention enable to prevent a degenerative process of a wearer's eye as a consequence of blue light-induced phototoxicity, such as the age-related macular degeneration.

Figure 5:
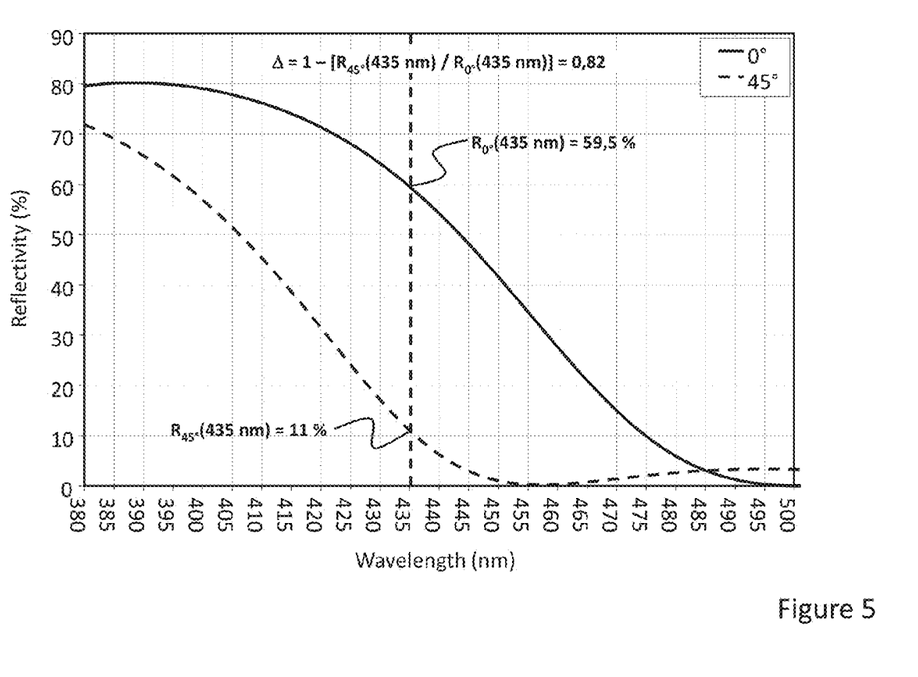
FIG. 5 represents the spectral reflectivity curves between 380 nm and 500 nm of the ophthalmic lens of Example 3 of the present application for angles of incidence on the front main face of 0° and 45°.

FIG. 5 represents the spectral reflectivity curves between 380 nm and 500 nm of the ophthalmic lens of Example 3 for angles of incidence on the front main face of 0° and of 45°.

It should be noted when considering the figure that the spectral reflectivity curve at 45° is shifted toward shorter wavelengths (i.e. to the deep blue and UV regions) as compared to the spectral reflectivity curve at 0°. This is an illustration of the high angular selectivity of the large filter of Example 3.

This shift then results in a low spectral reflectivity value at 435 nm for an angle of incidence of 45°, abbreviated $R_{45°}$(435 nm), i.e. equal to 11%, and much lower than the spectral reflectivity value at 435 nm for an angle of incidence of 0°, abbreviated $R_{0°}$(435 nm), equal to 59.5%.

It is thus understood the value of the parameter Δ(θ,θ') which here is high, is equal to 0.82. This applies for all the ophthalmic lenses provided with at least one large filter according to the present invention.

On the contrary, and as appears in the Comparative example tables, an ophthalmic lens provided with a filter not fulfilling the characteristics of the filters of the present invention, especially the full width at half maximum, has not a parameter $\Delta(\theta,\theta')$ high enough to protect efficiently against phototoxic blue light.

The invention claimed is:

1. An ophthalmic lens having a front main face and a back main face, at least one of both main faces comprising a filter, which provides the main face comprising said filter with the following properties:
 an average blue reflectance factor ($R_{m,B}$) within a wavelength range of from 420 nanometers to 450 nanometers, which is higher than or equal to 5%, for an angle of incidence ranging from 0° to 15°,
 a spectral reflectivity curve for an angle of incidence ranging from 0° to 15°, this reflectivity curve having:
  a maximum reflectivity at a wavelength of less than 435 nanometers, and
  a full width at half maximum (FWHM) higher than or equal to 80 nanometers, and
 for an angle of incidence θ ranging from 0° to 15° and for an angle of incidence θ' ranging from 30° to 45°, a parameter $\Delta(\theta,\theta')$ defined by the relation $\Delta(\theta,\theta')=1-[R_{\theta'}(435\,nm)/R_{\theta}(435\,nm)]$, in such a way that this parameter $\Delta(\theta,\theta')$ is higher than or equal to 0.6, where
  $R_{\theta}(435\,nm)$ represents the reflectivity value of the main face comprising said filter at a 435 nanometer-wavelength for the angle of incidence θ, and
  $R_{\theta'}(435\,nm)$ represents the reflectivity value of the main face comprising said filter at a 435 nanometer-wavelength for the angle of incidence θ'.

2. The ophthalmic lens according to claim 1, wherein the parameter $\Delta(\theta,\theta')$ is defined for an angle of incidence θ=15° and for an angle of incidence θ'=45°.

3. The ophthalmic lens according to claim 1, wherein the average blue reflectance factor ($R_{m,B}$) is higher than or equal to 10%.

4. The ophthalmic lens according to claim 1, wherein the maximum reflectivity is observed at a wavelength lower than or equal to 410 nm.

5. The ophthalmic lens according to claim 1, wherein the full width at half maximum is higher than or equal to 90 nanometers.

6. The ophthalmic lens according to claim 1, wherein the full width at half maximum is lower than or equal to 150 nanometers.

7. The ophthalmic lens according to claim 1, wherein the average luminous reflectance factor ($R_v$) on the main face of the ophthalmic lens comprising the filter is lower than or equal to 2.5%.

8. The ophthalmic lens according to claim 1, wherein the average luminous reflectance factor ($R_v$) on each of the main faces of the ophthalmic lens is lower than or equal to 2.5%.

9. An ophthalmic lens according to claim 1, wherein the filter is an interference filter.

10. The ophthalmic lens according to claim 9, wherein the filter comprises a number of layers lower than or equal to 11.

11. The ophthalmic lens according to claim 1, wherein the filter has a total thickness lower than or equal to 700 nanometers.

12. The ophthalmic lens according to claim 1, wherein the ratio $[R_{15°}(435\,nm)-R_{15°}(480\,nm)]/R_{15°}(435\,nm)$ is higher than or equal to 0.8, where $R_{15°}(435\,nm)$ and $R_{15°}(480\,nm)$ represent respectively the reflectivity of the main face comprising said filter at 435 nm and at 480 nm, for an angle of incidence of 15° on this main face.

13. The ophthalmic lens according to claim 1, wherein the reflectivity value at the maximum level of reflectivity of the main face comprising said filter, for an angle of incidence of 15°, is at least 1.5 times higher than the reflectivity value of the same main face, at a wavelength of 435 nm and for an angle of incidence of 15°.

14. The ophthalmic lens according to claim 1, wherein the filter is formed on the front main face of the ophthalmic lens.

15. The ophthalmic lens according to claim 14, wherein the back main face of the ophthalmic lens. comprises an antireflection coating efficient within the UV region.

16. The ophthalmic lens according to claim 1, wherein the parameter $\Delta(\theta,\theta')$ is higher than or equal to 0.65.

17. The ophthalmic lens according to claim 1, wherein the parameter $\Delta(\theta,\theta')$ is higher than or equal to 0.7.

18. The ophthalmic lens according to claim 1, wherein the parameter $\Delta(\theta,\theta')$ is higher than or equal to 0.75.

19. The ophthalmic lens according to claim 1, wherein the average luminous reflectance factor ($R_v$) on the main face of the ophthalmic lens comprising the filter is lower than or equal to 1.5%.

20. The ophthalmic lens having a front main face and a back main face, at least one of both main faces comprising a filter, which provides the main face comprising said filter with the following properties:
 an average blue reflectance factor ($R_{m,B}$) within a wavelength range of from 420 nanometers to 450 nanometers, which is higher than or equal to 5%, for an angle of incidence ranging from 0° to 15°,
 a spectral reflectivity curve for an angle of incidence ranging from 0° to 15°, this reflectivity curve having:
  a maximum reflectivity at a wavelength of less than 435 nanometers, and
  a full width at half maximum (FWHM) higher than or equal to 70 nanometers, and
 for an angle of incidence θ ranging from 0° to 15° and for an angle of incidence θ' ranging from 30° to 45°, a parameter $\Delta(\theta,\theta')$ defined by the relation $\Delta(\theta,\theta')=1-[R_{\theta'}(435\,nm)/R_{\theta}(435\,nm)]$, in such a way that this parameter $\Delta(\theta,\theta')$ is higher than or equal to 0.5, where
  $R_{\theta}(435\,nm)$ represents the reflectivity value of the main face comprising said filter at a 435 nanometer-wavelength for the angle of incidence θ, and
  $R_{\theta'}(435\,nm)$ represents the reflectivity value of the main face comprising said filter at a 435 nanometer-wavelength for the angle of incidence θ' and
 for an angle of incidence ranging from 0° to 15°, a parameter $\Delta_{spectral}$ defined by the relation $\Delta_{spectral}=1-[R_{0°-15°}(480\,nm)/R_{0°-15°}(435\,nm)]$, in such a way that this parameter $\Delta_{spectral}$ is higher than or equal to 0.8, where
  $R_{0°-15°}(480\,nm)$ represents the reflectivity value of the front main face at a 480 nanometer-wavelength for the relevant incidence, and
  $R_{0°-15°}(435\,nm)$ represents the reflectivity value of the front main face at a 435 nanometer-wavelength for the relevant incidence.

21. The ophthalmic lens according to claim 20, wherein the parameter $\Delta(\theta,\theta')$ is defined for an angle of incidence θ=15° and an angle of incidence θ'=45°.

* * * * *